(12) United States Patent
Vaidya

(10) Patent No.: US 11,258,818 B2
(45) Date of Patent: Feb. 22, 2022

(54) METHOD AND SYSTEM FOR GENERATING STATEFUL ATTACKS

(71) Applicant: Vimal Vaidya, Fremont, CA (US)

(72) Inventor: Vimal Vaidya, Fremont, CA (US)

(73) Assignee: IronSDN Corp., Fremont, CA (US)

( * ) Notice: Subject to any disclaimer, the term of this patent is extended or adjusted under 35 U.S.C. 154(b) by 350 days.

(21) Appl. No.: 16/263,586

(22) Filed: Jan. 31, 2019

(65) Prior Publication Data

US 2019/0238583 A1 Aug. 1, 2019

Related U.S. Application Data

(60) Provisional application No. 62/624,775, filed on Jan. 31, 2018.

(51) Int. Cl.
| | |
|---|---|
| *H04L 9/00* | (2006.01) |
| *H04L 29/06* | (2006.01) |
| *H04L 41/14* | (2022.01) |
| *G06F 30/20* | (2020.01) |

(52) U.S. Cl.
CPC .......... *H04L 63/1433* (2013.01); *G06F 30/20* (2020.01); *H04L 41/145* (2013.01); *H04L 63/1491* (2013.01); *H04L 63/145* (2013.01); *H04L 2463/144* (2013.01)

(58) Field of Classification Search
CPC ............... H04L 63/145; H04L 63/1491; H04L 63/1433; H04L 41/145; H04L 2463/144; G06F 30/20
See application file for complete search history.

(56) References Cited

U.S. PATENT DOCUMENTS

| | | | |
|---|---|---|---|
| 10,079,850 B1* | 9/2018 | Patil | H04L 63/1433 |
| 2004/0186720 A1* | 9/2004 | Kemmochi | G10H 5/00 704/258 |
| 2013/0232104 A1* | 9/2013 | Goyal | G06N 5/02 706/59 |
| 2014/0089908 A1* | 3/2014 | Dunn | G06F 8/443 717/151 |
| 2017/0006055 A1* | 1/2017 | Strom | G06F 30/20 |
| 2020/0050953 A1* | 2/2020 | Fischbacher | G06F 8/10 |

* cited by examiner

*Primary Examiner* — Beemnet W Dada
(74) *Attorney, Agent, or Firm* — R. Alan Burnett; Law Office of R. Alan Burnett, PS

(57) ABSTRACT

Methods and systems for generating stateful attacks for simulating and testing security infrastructure readiness. Attack templates descriptive of a plurality of attacks to be executed against one or more targets are defined. The attack templates are processed to compile a decision tree by traversing through a list of attack templates to create a logical tree with tree branches representing different execution paths through which attacks may be executed against the targets. During attack simulations and/or testing, single and/or multi-stage attacks are executed against targets, wherein attack sequences are dynamically determined using the execution paths in the decision tree in view of real-time results. The attacks may be executed against various types of targets, including target in existing security infrastructures and simulated targets. Moreover, the attacks may originate from computer systems within security infrastructures or remotely using computer systems external to the security infrastructures.

18 Claims, 14 Drawing Sheets

METHOD AND SYSTEM FOR GENERATING STATEFUL ATTACKS

CROSS-REFERENCE TO RELATED APPLICATIONS

The present application claims priority to U.S. Provisional Application No. 62,624/775 filed on Jan. 31, 2018, entitled "METHOD AND SYSTEM FOR STATEFUL MULTI ATTACK SIMULATION", the disclosure of which is hereby incorporated herein by reference in its entirety for all purposes.

FIELD OF THE INVENTION

The field and embodiments of this invention relate generally to a method and system for verifying security infrastructure, and more particularly, the embodiments relate to dynamically simulating security breach and attack scenarios to methodically test security infrastructure readiness.

BACKGROUND INFORMATION

The background description provided herein is for the purpose of generally presenting the context of the disclosure of the invention. Work of the presently named inventors, to the extent the work is described in this background section, as well as aspects of the description that may not otherwise qualify as prior art at the time of filing, are neither expressly nor impliedly admitted as prior art against this present disclosure of the invention.

Cyber threats or attacks come in many different forms ranging from network attacks to exploiting vulnerabilities in systems and applications, to tricking end-users in downloading many varieties of malware. Security experts have been working for years trying to stay ahead of attackers, hackers and other type of malicious users. To understand how specific attacks may work, different models have evolved in to sort of a consensus model that typically describe a cyber security breach occurrence taking place over six phases. This type of model is typically called cyber breach (threat) life cycle. It is also sometime alternatively called cyber-killchain, a term coined by Lockheed Martin, to specify that the earlier in the life cycle of a breach, if the potential threat (attack) is caught and stopped (killed), it prevents the security breach spread and limits the potential impact within organization to minimal damage.

While both cyber-threat life cycle and cyber-kill-chain describe similar phases or stage over which an actual security breach takes place, cyber-kill-chain focus is more towards detection and response. Therefore, phases described through cyber-kill-chain may be further split and hence potentially out of steps with phases (stages) typically described in cyber-threat life cycle. In any case, here is one such explanation of a life cycle of a potential cyber breach in an organization.

Stage 1: Finding Potential Exploit (Aka Reconnaissance)—

The first stage typically is identifying potential targets that satisfy the mission of the attackers (e.g. financial gain, targeted access to sensitive information, brand damage). Once an attacker determines what potential targets may be available at an organization, what defense may be in place, they choose their weapon, whether through generating denial-of-service attacks to bring down organization corporate network, exploiting a discovered vulnerability in publicly visible assets of an organization such as a web-server, targeting end-users through a spamming or spear-phishing campaign, bribing an employee, or some other method. If such attempt is caught and blocked at this stage, potential attack threats end right here. This is where the so-called preventive systems are deployed to detect and block such attempts and where major IT security spending occurs.

Stage 2: Initial Compromise (Aka Weaponization)—

This typically happens once an attacker or hacker bypasses perimeter defense and gains access to the internal network through a compromised system or user account. After this stage, it's becomes more and more difficult to detect the breach since at this stage attacker have gained access potentially as an authorized user within the organization.

Stage 3: Establish Command & Control—

The compromised system is then used as an entry-point into an organization. Typically, this involves the attacker downloading and installing a remote-access Trojan (RAT) or other malware to establish persistent, long-term, remote access to the target organizations' environment.

Stage 4: Spread Through Lateral Movement—

Once such an externally controlled connection is established in to the internal network, attacker then tries to spread the breach by trying to compromise additional systems and user accounts. It's difficult to detect such later spread of the attack if the attacker has already gained access as an authorized user such as an administrator. However, if the attacker tries to use commonly used recon techniques to discover other systems and break-in, then such attempts may be identified and prevented.

Stage 5: Control of Environment—

At this stage, the attacker has potentially gained control of at least one or possibly many systems within the organizations environment, may have established multiple methods for remote access and may have control of multiple user accounts. At this stage the attacker may take action to execute his targeted action or stay dormant until final target actions are ready to be executed.

Stage 6: Take Action (Exfiltration, Corruption, and/or Disruption)—

This is where the attacker executes the intended goal. The damage here can range from intellectual property or confidential (or sensitive) information/data theft, to using internal systems as launchpad for launching and spreading attacks to other organization (typically called zombie systems), to causing massive disruption to the target organization's business and mission-critical systems. At this stage attacker has many ways to utilize the gained access and control of target organization's systems for many different purpose and potential exploits. If such attack spread has not been detected prior to or during this stage, the organization's financial and reputation-damage costs start rising substantially.

The term security infrastructure typically includes deployed security solutions, software, scripts, processes, detection techniques, security event management and other methods in a company's internal and external networks, servers, endpoints as well as network components, servers, applications, endpoints, other devices and software.

Many methods and solutions have existed to test the security of an existing security infrastructure. Vulnerability scanners have existed since early days of Internet so have different methods of testing the security infrastructure. Manual penetration testing utilized many different tools to simulate different types of attacks and cyber threats. In early 2000s, tools such as the Metasploit project provided a method for IT (Information Technology) security testers to create their own testing scripts to simulate different threats and attacks. More and more such tools have been developed by several companies. In addition, companies may use various security verification (testing) methods to evaluate and test their deployed security infrastructure. These verifications allow the companies' IT staff to ensure that threats are detected, prevented and adequate response procedures and processes are in place.

The foregoing methods and solutions are static, following predefined execution sequences (defined in the scripts) that do not adequately address real-world attacker behavior. What is needed is a dynamic security infrastructure verification (testing) system which can simulate an actual attacker behavior through dynamically followed, stateful simulation of attacks, based on received results and their logical next follow-up, representing different stages of potential cyber threat life cycle.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 14b is a rear isometric view of the blade server chassis of FIG. 11a;

DETAILED DESCRIPTION

Figure 1A:
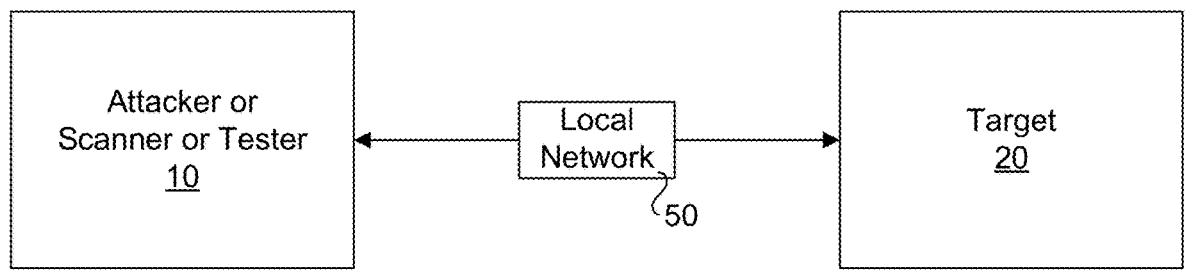
FIG. 1a is a block diagram illustrating a first security testing scheme where one system acts as an attacker, tester or scanner, while another system on the same local network acts as a target.

Embodiments of methods and systems for verifying security infrastructure readiness using stateful attacks, are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

A dynamic simulation of attacks selected based on results of each breach life-cycle stage to learn and follow-on to the next life-cycle stage, can allow a replication of a real-life security breach through-out its life-cycle. Utilizing a simulated attacker module which working in conjunction with a simulation target running on an actual target system, can allow a complete simulation of such dynamically determined attack sequences. The simulated attacker can either execute attack against one or more simulated targets or one or more actual target computing systems.

Generally, as used herein, an actual target is a computing system or device that is a real, potential, attack target deployed in the existing security infrastructure being tested, such as a real server, network device, endpoint, etc. The results are derived from how the server, network device, endpoint handles the attack.

A simulated target can either be one or more software modules simulating a targets' behavior such as different network devices, servers or endpoints, while running on a computing system; a complete system that simulates an actual target; or one or more software modules working in conjunction with the attacker to participate in various attacks, communicate various command and control messages, collect and update results, while running on an actual target or existing computing device The simulated target is implemented, in part, by running software to simulate the operation of a target.

In one embodiment an attacker module and a target module may be running on the same system. In another embodiment, they may be running separately on two separate systems, one acting as an attacker and another acting as the target. In one embodiment there may be one or more attackers executing attacks against one or more targets. In one embodiment, the command-and-control module is separate from attacker and target modules, in another a command-and-control module may be embedded inside the attacker module. In one embodiment, attacker and target communicate frequently to keep a sequence of attack going. In another embodiment, the attacker and target may communicate at the beginning and end of each attack sequence. In yet another embodiment they communicate whenever required such as at either beginning, end or during an attack sequence or a complete simulation run. In another embodiment, the attacker and target may never communicate as they may be governed by a separate management module.

In an embodiment, where a simulated target is used to simulate attack against, a target module may be installed on a computing device such as a network device, a server or an endpoint. In such embodiments with simulated targets, some of the simulated target's primary responsibilities are to a) participate with the attacker in bi-directional attack simulations, b) keep track of the results of each of the attack simulations during the current run of attacks and c) communicate with the attacker and management systems for control communications. In this embodiment control communication may include but not be limited to, receiving attack profile information before the attack run begins; tracking, updating and providing the results of all attack simulations during and at the end of the attack run; and participation in management functions. In one embodiment, an attacker or attackers communicate with a central management module to simulate attacks against a simulated target. In another embodiment, an attacker is an independent self-operating module which executes attacks against a simulated target, coordinates and communicates with the simulated target before and after attack simulation run, collects and records results. In one embodiment, a central management module collects results from all attackers and displays results for human interpretation in form of one or more reports. In another embodiment an independent self-operating attacker executes attacks, collects results and displays results for human interpretation in form of one or more reports.

In some embodiments, only an attacker or multiple attackers are deployed to execute attacks against real target servers. In such embodiments, simulated target modules are never deployed. Rather, the target server may be an actual physical or virtual application server such as a web-server, a database server, or an off-the-shelf or a custom-built application server. In another embodiment, the target server can be a network device such as a router, a firewall or other type of physical or virtual network appliance. In yet another embodiment, the target server can be an endpoint computer such a user desktop, laptop, mobile device or other type of computing system used by an end user. In this embodiment, the attacker not only executes attacks against target but also collects potential results, interprets the result and updates the result database accordingly. This type of attack environment may be called an "actual infrastructure" environment as compared with a simulated attack environment where both attackers and simulated targets are deployed. In one embodiment of an actual infrastructure attack, the attacker executes attacks one-at-a time, then collects, interprets and records results. In another embodiment, the attacker may execute a sequence of attacks, collect, interpret and then record results once the entire sequence of attacks is executed. In one embodiment, such an attacker or attackers communicate with a central management module. In another embodiment, an attacker is an independent self-operating module and executes attacks against a real server, collects and records results. In one embodiment, a central management module collects results from all attackers and displays results for human interpretation in form of one or more reports. In another an independent self-operating attacker executes attacks, collects results and displays results for human interpretation in form of one or more reports.

FIG. 1a is a block diagram illustrating a first security testing scheme where one system acts as an attacker, tester or scanner, while another system on the same local network acts as a target. As illustrated, an attacker/tester/scanner 10 is coupled in communication with a target 20 via a local network 50, such as a local company network. Attacker/tester/scanner 20 may have a security testing, attack generation, vulnerability and other threat scanner product installed or may be used by a human as an attacker system. Target 20 may or may not have any software, application or other component installed on it; however, it is being used as a potential target of an attack, testing or scanning. Target 20 can be a single system or multiple systems on the network.

Figure 1B:
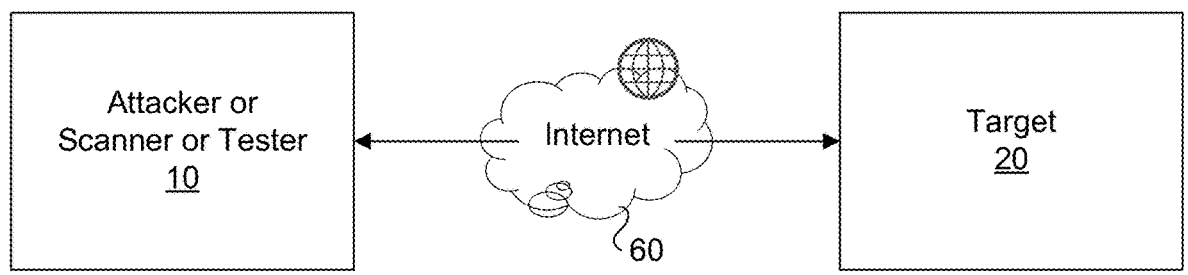
FIG. 1b is a block diagram illustrating a second security testing scheme under which the attacker/tester/scanner system or human utilizing the attacker/tester/scanner system remotely interacts with a target via a wide area network such as the Internet to perform security testing and/or evaluation.

FIG. 1b a block diagram illustrating a second security testing scheme under which the attacker/tester/scanner 10 or human utilizing the attacker/tester/scanner remotely interact with a target 20 via a wide area network such as the Internet 60 to perform security testing and/or evaluation. Under a typical implementation, target 20 will comprise company security infrastructure. Under some embodiments, the remote access may be provided via a secure channel or other secure means such as a VPN.

Figure 2:
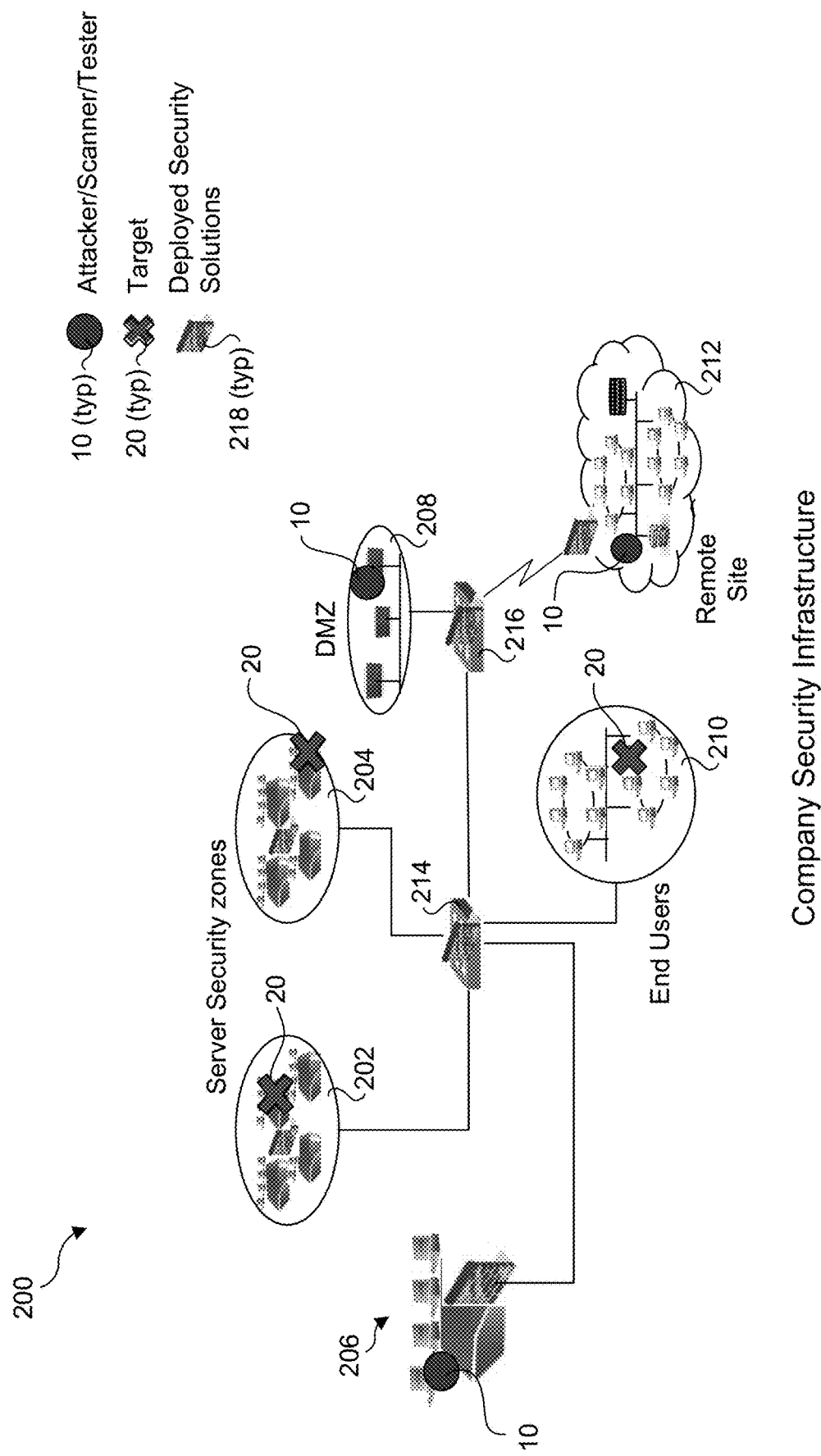
FIG. 2 illustrates a first exemplary deployment of various attacker/tester/scanner systems and various targets in a company network across some or all of the company's different security zones, wherein the attackers/scanners/testers and various targets are all on company's own network.

FIG. 2 illustrates a first exemplary deployment of various attacker/tester/scanner systems and various targets in a company network across some or all of the company's different security zones, where various assets of the company are deployed such as application servers, end-user systems, de-militarized zones (DMZ) and even remote sites within a company security infrastructure 200. The illustrated company security infrastructure includes server security zones 202 and 204, application servers 206, a DMZ 208, end users 210, and a remote site 212, which are interconnected with various network infrastructure depicted as switches 214 and 216. Company security infrastructure 200 also includes deployed security solutions 218. Under the deployment shown in FIG. 2, the attackers/scanners/testers 10 and various targets 20 are all on company's own network whether on (a) local site(s) and/or remote site(s).

Figure 3:
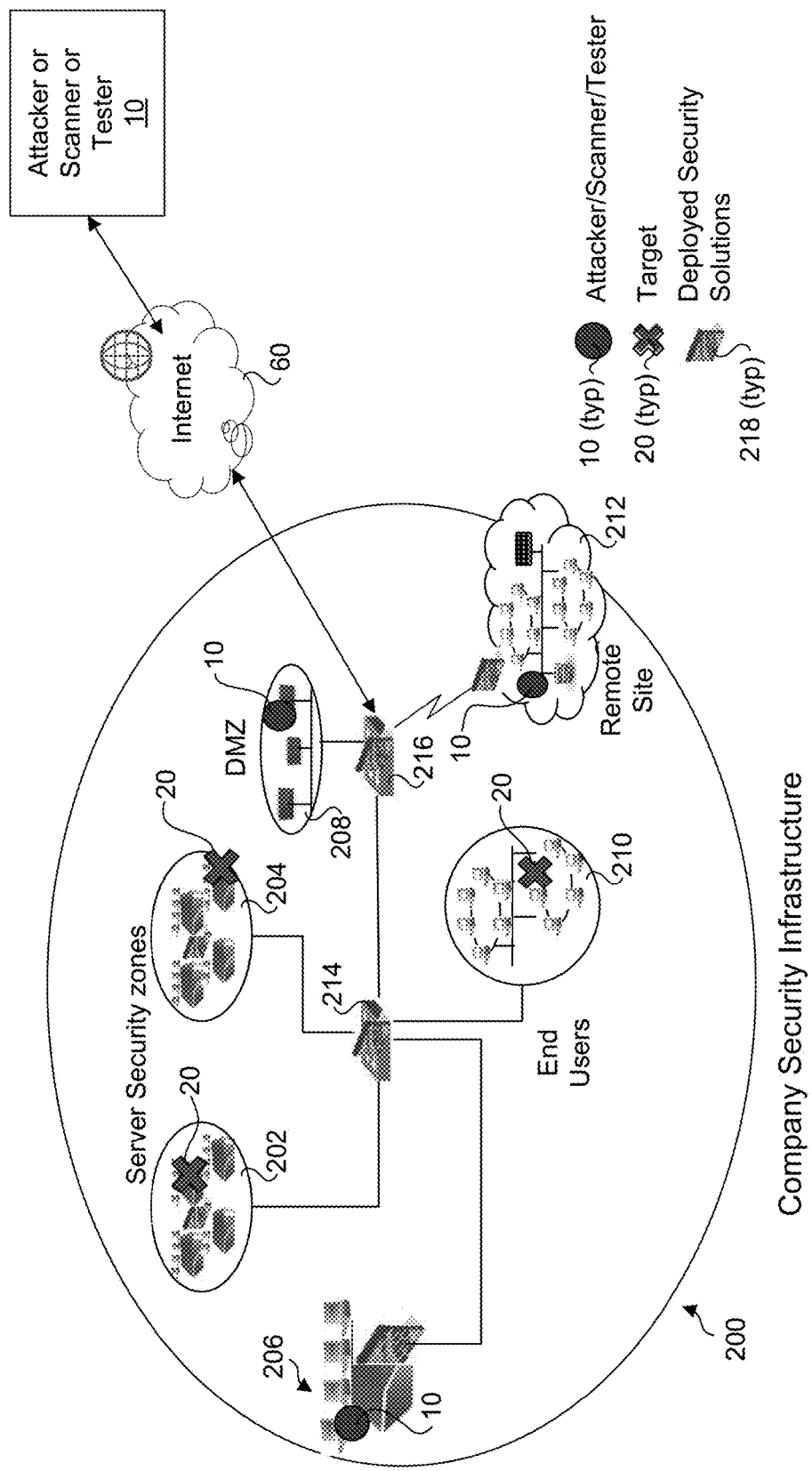
FIG. 3 illustrates a second exemplary deployment of various attacker/tester/scanner systems and various targets in a company network across some or all of the company's different security zones, wherein an attacker/tester/scanner can be on the company's network or accessed remotely over the Internet.

FIG. 3 illustrates a second exemplary deployment of various attacker/tester/scanner systems and various targets in a company network across some or all of the company's different security zones. As shown, attackers/scanners/testers 10 can be local on the company's own network as well as possibly coming from a remote location accessed through Internet 60.

Figure 4:
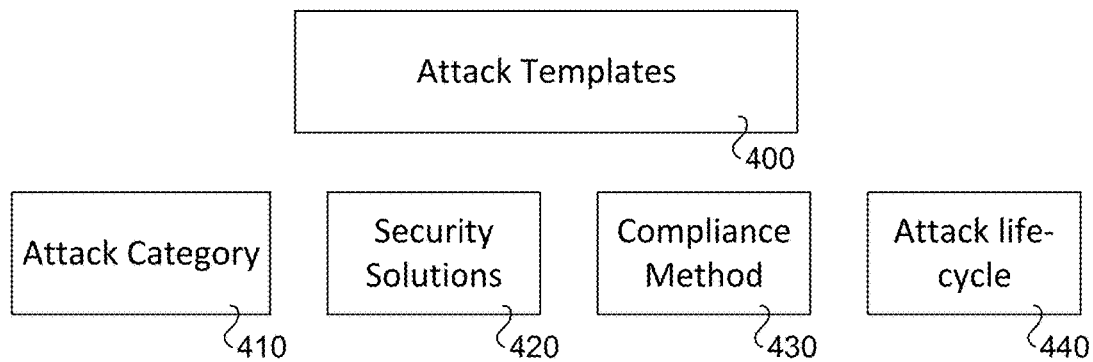
FIG. 4 is a schematic diagram illustrating components of an attack template and classifications.

FIG. 4 is a schematic diagram illustrating components of an attack template and classifications, including attack templates 400, attack category 410, security solutions 420, compliance method 430, and attack life-cycle 440. In one embodiment, the attack template and classification may include fields such as:

Attack Name & Description for each attack; Type of attack by category of attack—for an example can be Firewall Attacks, Intrusion Prevention Attacks, Ransomware, Spyware Transfer, Evasion Techniques etc.; Type of attack by method or applicable infrastructure component—for an example can be EndPoint Attacks, Web Server Attacks, Host scan, Network Crawler; Malware Attacks, Email Spoofing-Spamming etc.;

Type of attack by other references—that may be specific to the current attack being simulated; Which Security Solutions should detect and block this attack (i.e. which solutions are impacted)—for an example can be Firewall, Anti-Malware, Data Leakage Prevention, Intrusion Prevention etc.;

Set of Input—are parameters required to simulate the current attack effectively; Expected set of output—are the expected result information after the current attack simulation completes; What stage in attack life-cycle (or cyber-kill-chain) does this apply—for example can be Reconnaissance, Weaponize etc.;

What are the preceding life-cycle (or cyber-kill-chain) stages—is the previous stage of cyber-kill-chain that should precede the current attack; List of potential preceding set of attacks (references)—for example are the attacks that could have result in this current attack being executed next; What is the expected next life-cycle (or cyber-kill-chain) stage—is the stage that follows the current attack if successfully executed;

List of potential next set of attacks (references)—are the list of attacks, as applicable, that can follow the current attack, if successfully executed; List of attack application method and components it may apply to—for example can be network, server, endpoint etc.; and Attack method type and other relevant information for attack execution—this information can be used to further analyze the required execution of the current attacks; Reference to or Actual attack—for example can point to a method, code, script, binary etc. that can be called to once, multiple times or in succession to execute the current attack.

In one embodiment, attack templates 400 may start with two types of initial classification: one is what type simulation method it uses (e.g., as defined in attack category 410) and potential infrastructure components it targets (e.g., as defined in security solutions 420); and the second is the attack category to determine what stage of attack life-cycle or cyber-kill-chain the attack may apply to. In one embodiment, an attack template may include additional fields beyond described above. In one embodiment, attack templates are created manually, in another, they may be created by a script or scripting language and in yet another embodiment they may be created through other types of automated methods. Generally, attack templates may be created using one or more of the foregoing approaches.

Figure 5:
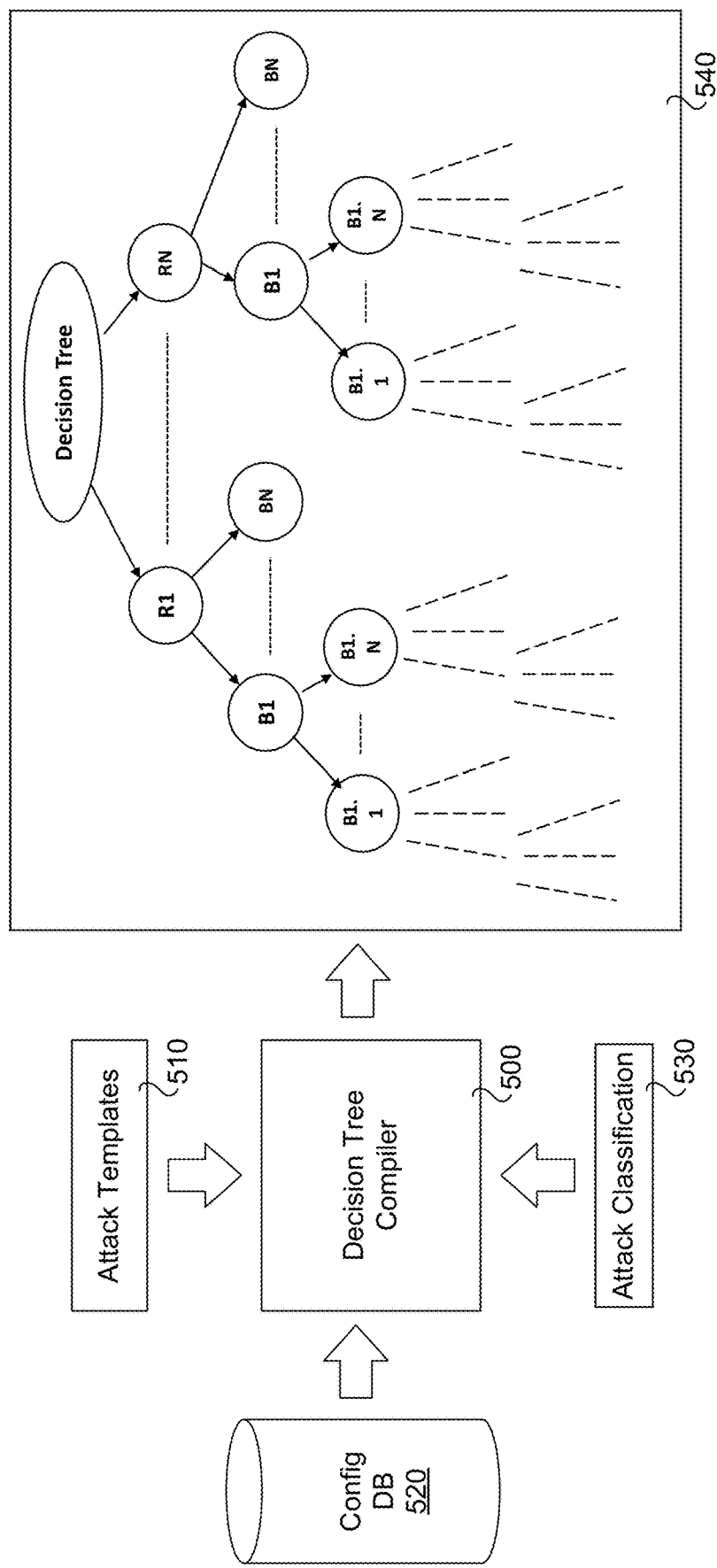
FIG. 5 is a block diagram illustrating input and output of the decision tree compiler according to one embodiment.

FIG. 5 demonstrates one example embodiment of the stateful decision tree builder or compiler (DT Complier) 500. In this embodiment, DT compiler 500 takes multiple inputs such as configuration information read from a configuration database 520, pertinent attack templates 510 for the current execution of stateful, dynamic attack simulation engine, and template attack classification information 530. In this example embodiment, it then goes through the list of specified templates and creates a decision tree 540 as outlined in FIG. 5. Decision tree 540, for example, can include fields such as attack root nodes, each with multiple sets of branches and sub-branches as applicable, representing attacks that follow one-after-the-other in a sequence, based on different stages of execution and expected results of those attack simulations. In one embodiment, the DT complier 500 can be in form of a separate process. In another, it can be integrated in to a stateful, dynamic, decision tree based, attack simulation engine (DTS engine), such as depicted by DTS engine 600 in FIG. 6. In yet another embodiment, it can be a separate executable or method. In one embodiment, the DT complier 500 can be executed off-line, in another embodiment, it can be executed in-line with the execution of DTS engine 600, and in yet in another embodiment it can be a combination of off-line and in-line execution. In one embodiment, DT Complier 500 may be called upon only once to create the decision tree. In another embodiment it may be called upon multiple times or as often as required.

Figure 6:
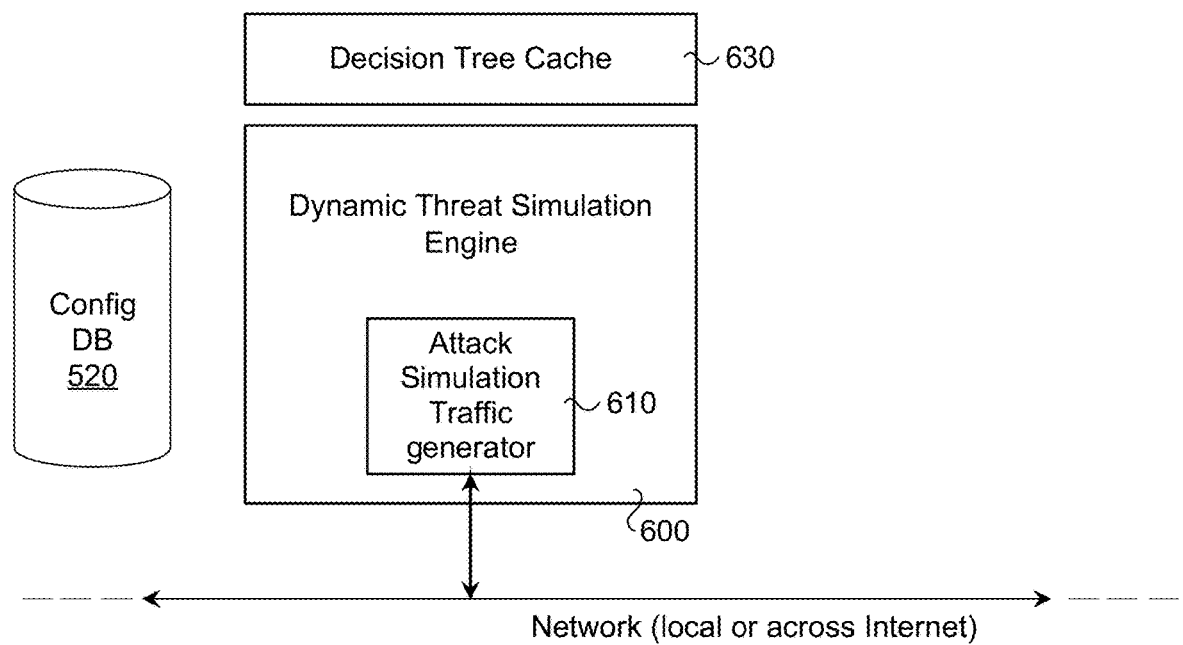
FIG. 6 illustrates a block diagram of the stateful, dynamic, decision tree driven attack simulation engine according to one embodiment.

FIG. 6 illustrates one embodiment of a DTS engine 600. In this embodiment, the DTS Engine 600 utilizes the decision tree generated by the DT Compiler 500 along with the run profile information and configuration to simulate attacks against the intended target system 20 using an attack simulation traffic generator 610 to measure the effectiveness of deployed security infrastructure in detecting and preventing various types of dynamically executed threats and attack scenarios. DTS engine 600 first connects with target 20 and provides to target 20 the details of the Run-profile (the configuration parameters and attacks details to be simulated). Next, using the decision tree generated by DT Compiler 500, the DTS engine goes through each root node and follows through each of the specific, applicable branches of each root node and executes (simulates) the actual attack simulation for each, records the results and compares the expected and actual results to move to the next applicable node of the branch. Once all potential attacks of a branch are executed, it moves to the next applicable branch of the root node and so forth, until all applicable branches in each of the root nodes are executed. It then collects results observed by target 20 and consolidates them with its own results to create the final results and records them in to a configuration database 520 with the run-profile and result config information for future reference and for user delivery. As further illustrated, a decision tree cache 630 may be used to cache information relating to the decision tree to enhance performance.

Figure 7:
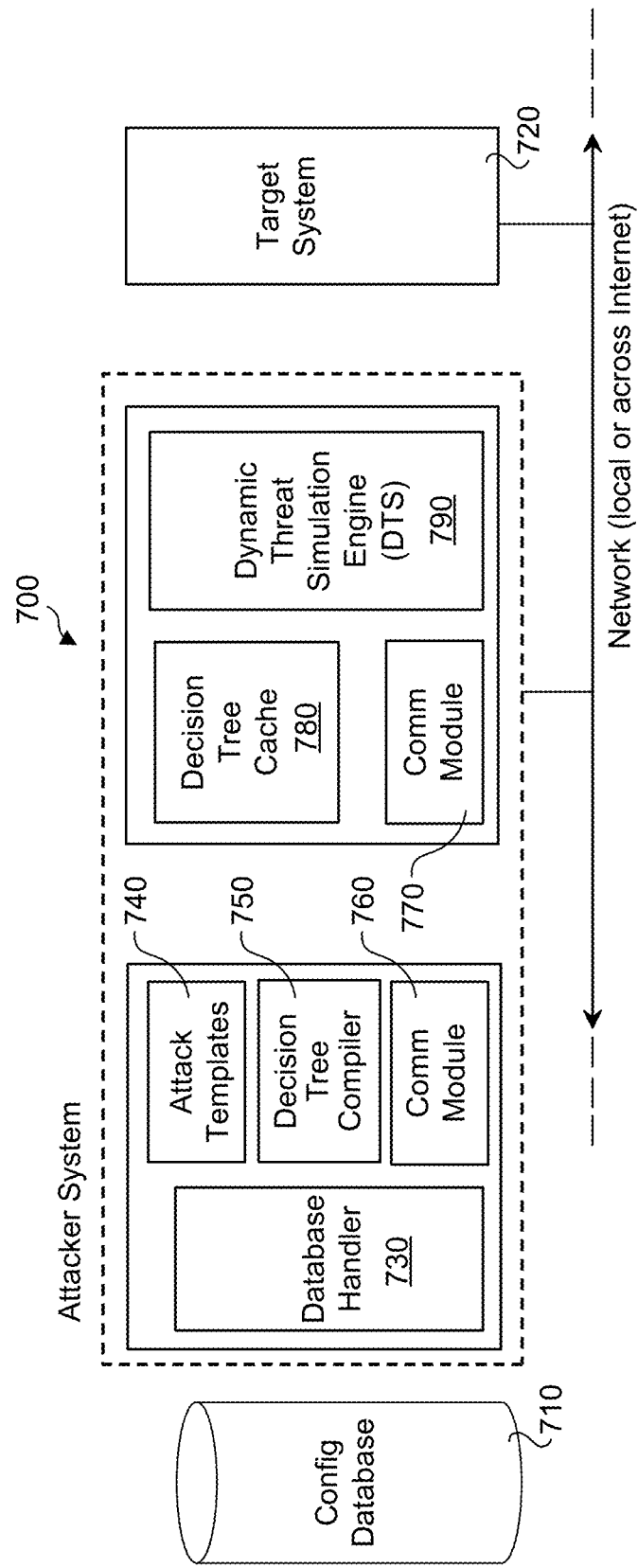
FIG. 7 is a block diagram of the components of the decision tree driven attack simulation engine according to one embodiment.

FIG. 7 is an illustration of a block diagram of the components of one embodiment of an Attacker System 700. In this embodiment, Attacker 700 includes components such as a Database Handler 730 and a DT Compiler 750. Database handler 730 communicates with a configuration database 710 using a Comm module 760 to retrieve configuration information such as Attack Templates 740 and store results and perform other relevant database-related tasks. DT Compiler 750 is called as required to generate an attack Decision Tree that is stored in Decision Tree Cache 780. DTS Engine 790 then utilizes information in the Decision Tree to generate attacks against a target System 720 using a Comm module 770 on the given network, which, for example can be a local area network, wide area network or the Internet.

Figure 8:
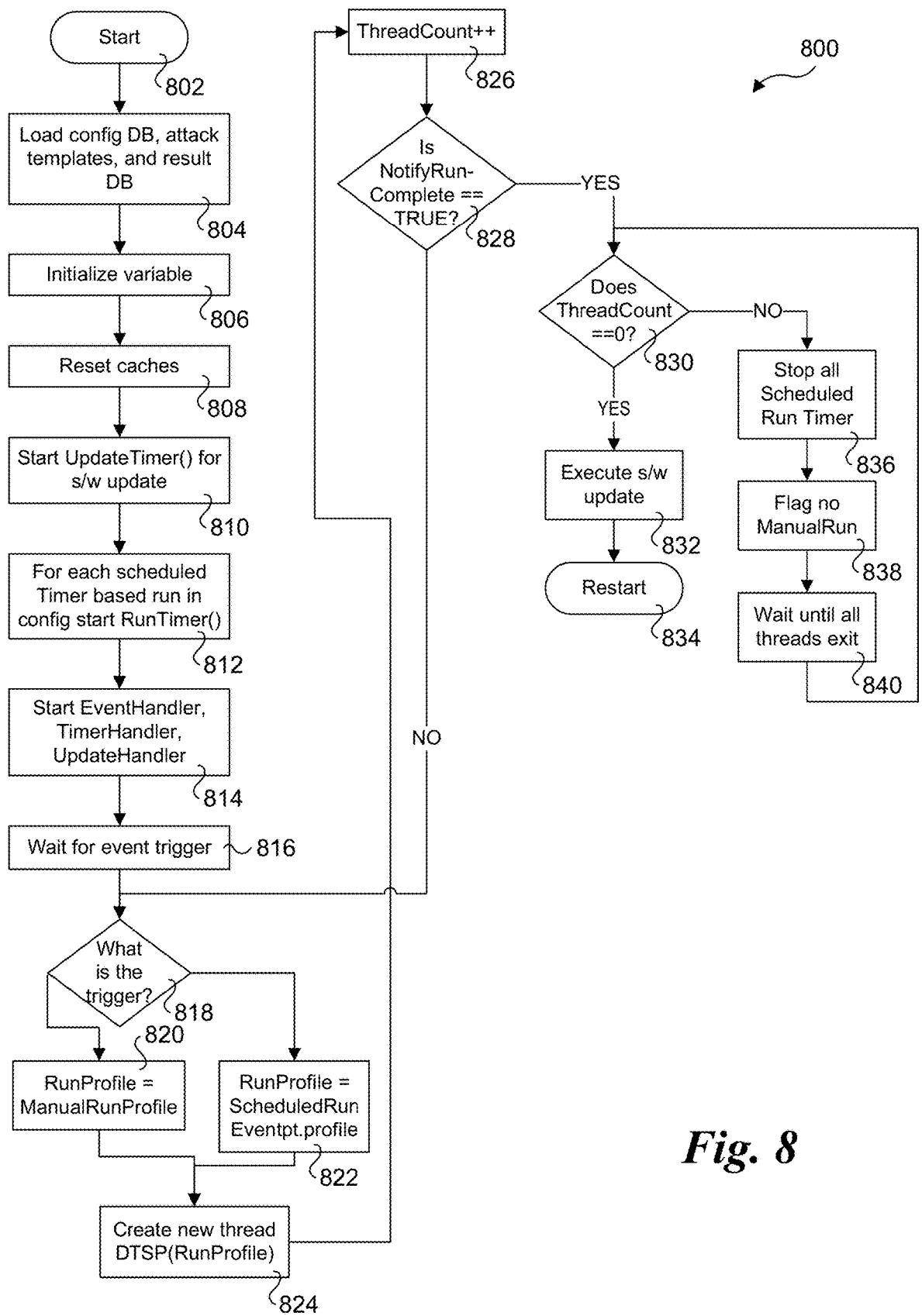
FIG. 8 is the flowchart illustrating the high-level flow of the main program utilizing timer driven events to fork and run multiple instances of decision tree driven attack simulation engine (DTSE) according to one embodiment.

FIG. 8 shows a flowchart 800 illustrating operations and logic implemented by one embodiment of a main program. The main program utilizes multiple process threads to execute multiple instances of DTS engine 600 for enhanced performance and to potentially provide simultaneous attack simulations against multiple target systems 10. The logical flow of the main program and its modules herein describe one possible implementation and is meant just as such, i.e., a logical flow and not as a ready-to-implement complete program. Therefore, certain programmatic details such as, for example, communication services between attacker and target and command-and-control (as applicable), console-based-events handling, handling of timer or thread execution race conditions etc. are not illustrated in FIG. 8; however, it will be understood by those having skill in the art that such programmatic details would be implemented in an actual system.

The process begins in a start block 802 followed by a block 804 that loads the configuration and result database tables entries (pointers) as well as the attack templates in Attack Simulation database. Variables are initialized in a block 806 and applicable caches are reset in a block 808. Some of these variables and caches are used and shared with the DTS engine threads, as illustrated below in FIG. 11.

In a block 810, a timer for checking and downloading software and attack database updates on a periodic basis is started. The timer is employed to ensure all software components including attack templates remain current with the distributed software updates.

The process then goes through each of the scheduled simulation runs and their respective timer profiles to schedule timers for each of them, as depicted in a block 812. Once all timers are scheduled, block 814 starts event handler threads including EventHandler, TimerHandler and UpdateHandler threads. Each of those threats handle their specific events respectively, including timer expiry and console driven events, as described below in further detail.

In a block 816 the main process waits for a specific event to occur, as detected by an event trigger. The wait is broken when either a console-driven event occurs (e.g., a manual run of attack simulation) or when one of the scheduled run timers expire. In a decision block 818 a determination is made to the type of event trigger that is detected. As depicted in a block 820, if the event is manual-run, then the current RunProfile from the event data is retrieved. If the event is timer-run, then the timer event data has the pointer to the RunProfile, as depicted in a block 822. The RunProfile contains pertinent information about the required attack simulation for this run. It includes information such as a) which system is acting as the attacker and which as the target; b) specific categories of attacks which need to be simulated; c) what type of simulation needs to be run (i.e. network, endpoint, server, application) as well as d) whether it's a stateful simulation or straight simulation which executes attack contained in the profile one by one, without the stateful follow-through; and other relevant information. In one embodiment, the RunProfile is used throughout the program including DTS Engine, DT Compiler and other modules.

In a block 824 a new DTS Engine thread for the current run of the attack simulations is created. The DTS Engine is provided the pointer to the current RunProfile as a base configuration for simulating attack during this specific run. In block 826 a TotalThread count is incremented for housekeeping purposes.

A decision block 828 checks to see if the NotifyRunComplete variable is set to TRUE, which indicates there is a pending software update which has been downloaded. If the variable is TRUE, the main program suspends starting any new DTS Engine threads until all currently running threads finish their execution, at which point the software updates including new attack templates can be handled and incorporated in to the process data. This logic is illustrated in blocks 830, 832, 834, 836, 838, and 840.

As depicted by the loop connected to decision block 830, the process loops until the thread count is 0, indicating all threads have completed execution. If the answer to decision block 830 is NO (one or more threads are currently running), the logic proceeds to stop all scheduled run time threads in block 836, flag no ManualRun in block 838, and wait until all threads exit in block 840. After all threads have exited, the process loops back to decision block 830, which no detects the thread count is 0, causing the logic to proceed to execute the software update in block 832 to incorporate new updates in to the configuration and attack template databases. The main process is then restarted in restart block 834. The main program runs indefinitely until either the system is rebooted or a manual kill signal is sent to end the process.

Figure 9:
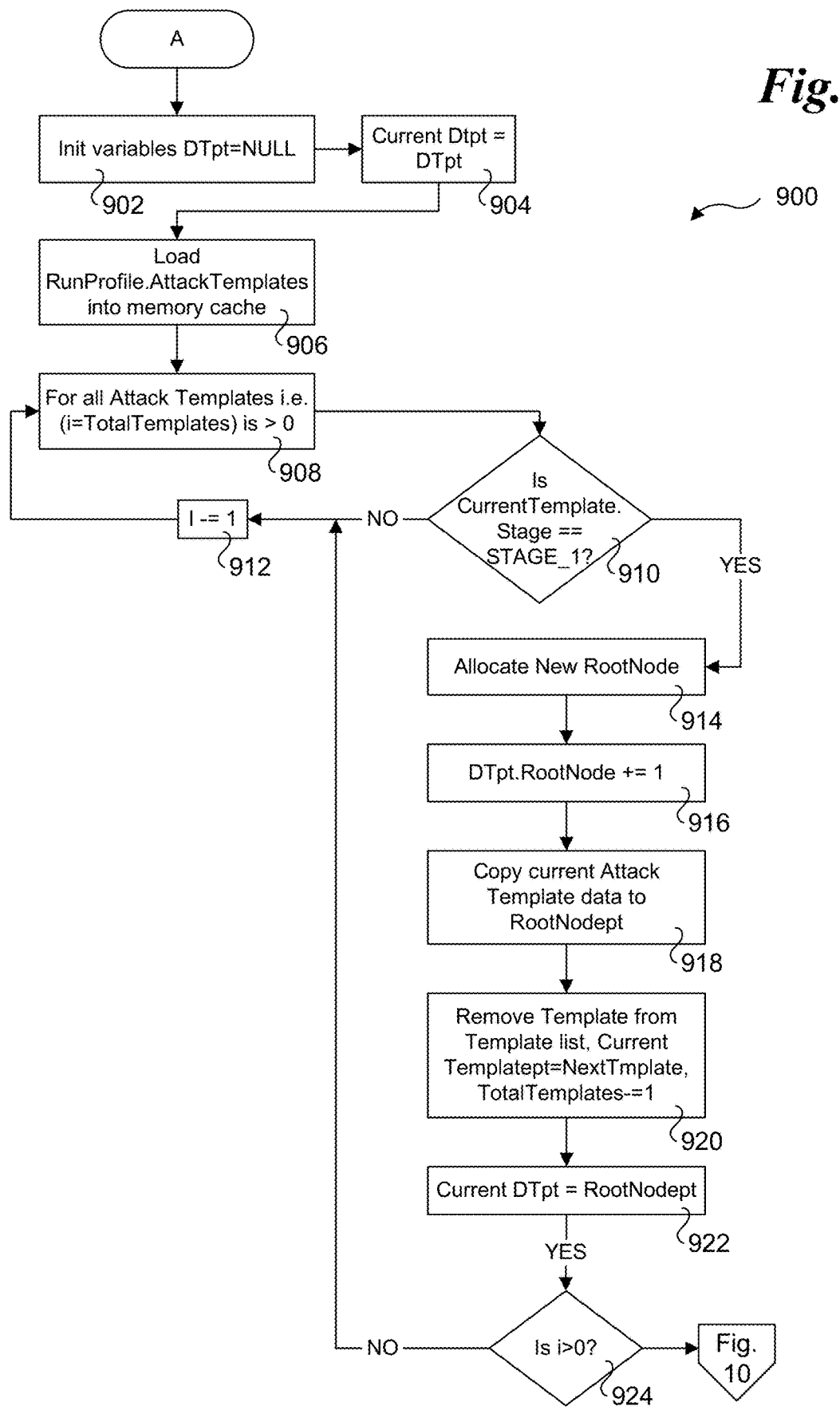
FIG. 9 is a flowchart illustrating operations and logic for implementing a decision tree compiler, according to one embodiment.
Figure 10:
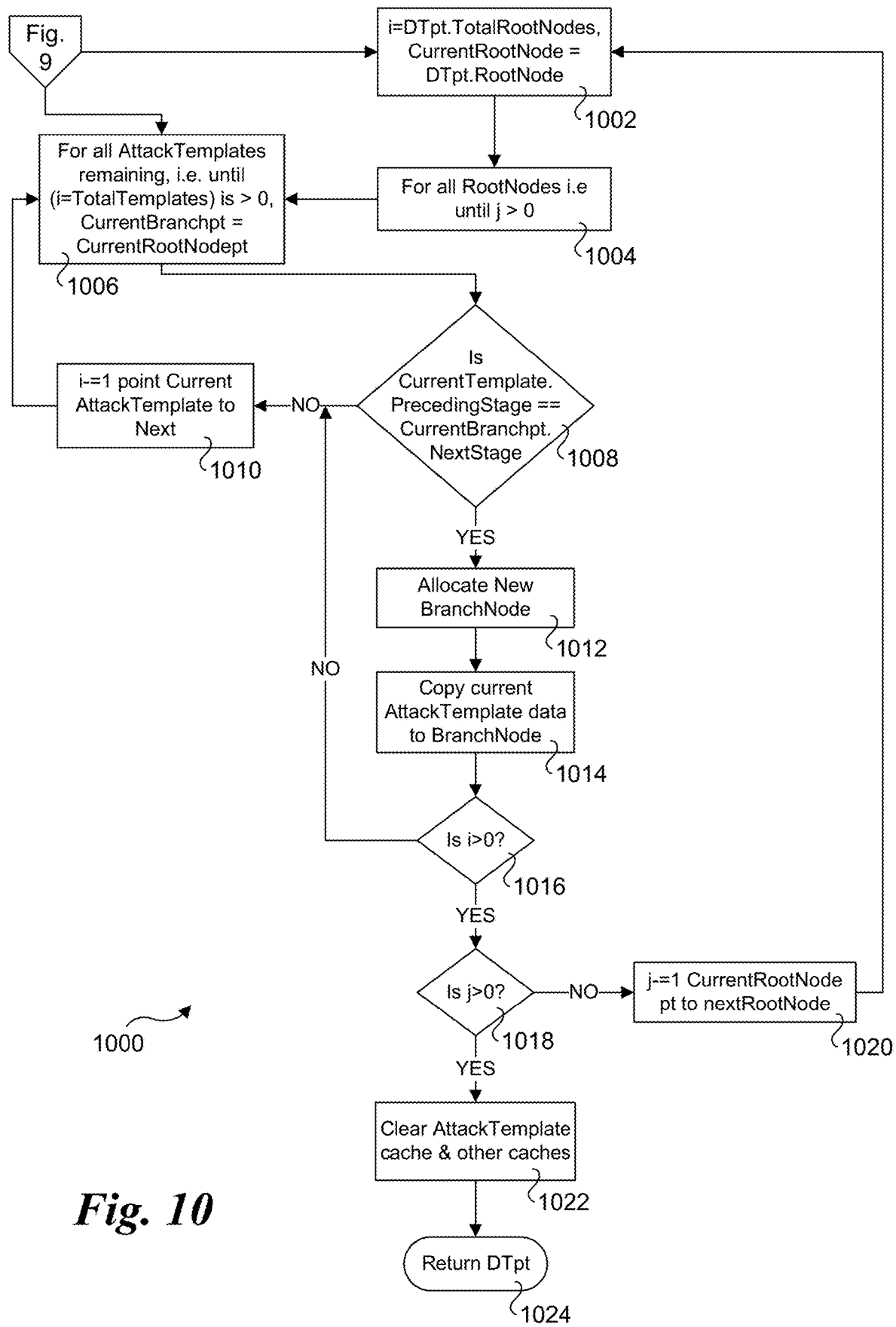
FIG. 10 is a continuation flowchart illustrating operations and logic for implementing a decision tree compiler, according to one embodiment.

FIG. 9 and FIG. 10 respectively show flowcharts 900 and 1000 corresponding to the logical flow for the decision tree compiler (DT Compiler) module, according to one embodiment. The DT Compiler utilizes the attack templates from the current RunProfile and creates a logical decision tree for the DTS engine to execute for the stateful attack simulation based on dynamically received results of each attack simulation. The logic required to build decision tree nodes, branches and sub-branches is fairly straightforward to one knowledgeable in the art of software and information security, once the decision tree architecture is understood as represented in FIG. 5.

In blocks 902 and 904 variables and caches including the attack template cache, the DTpt and CurrentDtpt variables are initialized. Block 906 loads the attack templates pointers contained in the current RunProfile to the cache for faster execution.

The next set of blocks 908 through 924 go through each of the attack templates once to determine which set of attack simulations make up the root nodes of each the decision tree. (See discussion of FIG. 5 above for more details on decision tree nodes called root nodes and branch nodes). Block 908 is the start of the loop for identifying and creating root nodes of the decision tree, while decision block 910 checks if the current stack template simulates a stage 1 (i.e., reconnaissance type of) attack. If the answer to decision block 910 is not, the logic proceeds to decrement I in a block 912 and returns to block 908 to evaluate the next attack template.

If the current template simulates a stage 1 attack, the logic proceeds to allocate a root node memory in block 914, and increment the root node count in the main decision tree handle in block 916. Block 918 is to copy attack template details in to the root node contained in the decision tree cache. Block 920 removes the template from the current attack template list since it contains root node attack simulation and will not be executed multiple times. Block 922 links the node to the next root node pointer in the decision tree. In decision block 924 a determination is made to whether all of templates have been checked, and if so, the logic continues to perform the operations and logic shown in flowchart 1000 of FIG. 10. If all the templates have not been checked, the answer to decision block 924 will be NO, and the logic will decrement I in block 912 and return to block 908 to process the next attack template.

The logic depicted in blocks 1002, 1004 and 1006 in flowchart 1000 determines whether to continue down the same branch, start a new branch or go to the next root node. Blocks 1006 through 1018 comprise a loop that goes through each attack template once for creating branches under the current root node. These operations check whether the template applies as a logical next-in-line based on various parameters including preceding stage, next (following) stage, expected results from current attack to match next attack templates expected input etc. Based on these comparisons, the branch is either continued to be built or another sub-branch to begin. Once all attack templates are exhausted, then the root node counter is decremented and start the same loop with the next root node. Once the branches and sub-branches for all root nodes are built, the answer to decision block 1018 will be YES, and the logic will proceed to a block 1022 which clears out local caches and other variables and return the newly created decision tree in return block 1024, represented by DTpt to the calling process.

Figure 11:
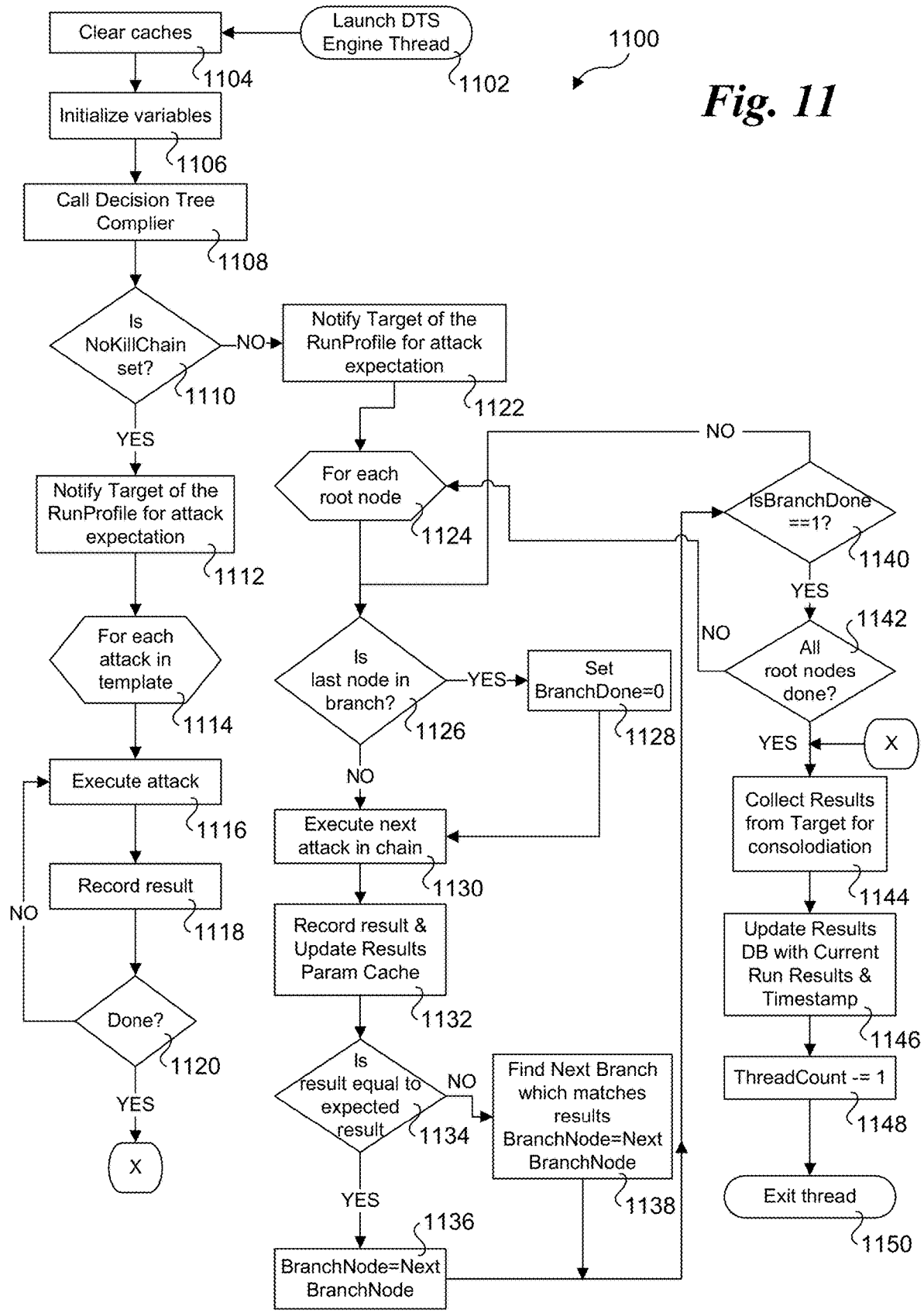
FIG. 11 is a flowchart illustrating operations of a decision tree driven engine thread started by the main process 800, according to one embodiment.

FIG. 11 shows a flowchart 1000 illustrating the DTS Engine thread's logical flow, according to one embodiment. The DTS Engine primarily performs two tasks; one is to execute the DT Compiler at run-time to create the decision tree from the given RunProfile and related attack templates, and the second is to go through the newly decision tree for this attack simulation run and generate specific attacks based on received results of each attack simulation. To that end, the DTS engine only requires RunProfile as the input and once completed, generates the output in form of the consolidated results of the current run of attack simulations.

In a start block 1102 a DTS engine thread is launched, with block 1104 and 1106 being configured to clear and initialize caches and variables. Block 1108 calls the DT Compiler (FIGS. 9 and 10) to generate the attack decision tree for this simulation run. Once the decision tree is ready, a determination is made in a decision block 1110 to see if this simulation run requires stateful execution based on the decision tree and received results of executed attack simulations at each node, or just a straight one-after-the-other attack execution. If it's the latter, which corresponds to NoKillChain being set, the logic proceeds to blocks 112 through 1120, then step 1112 through step 1120 to execute (block 1116) each of the attacks contained in the attack templates provided through the current RunProfile configuration and record the results (block 1118). First, however, if the target is a simulated target then the target needs to be notified of all attacks which are going to be run (in block 1112), so it can expect those attacks to measure results in terms of the successful (breached) or failed (blocked) attacks. Once all attacks are completed, as determined by a YES result for decision block 1120, execution continues to the end of the thread for consolidation of results both locally observed and collected from the target if the target is a simulated target, as depicted in blocks 1144 through 1150.

If the answer to decision block 1110 is NO, the logic proceeds to notify the target if the target is a simulated target, of the RunProfile for the expected attack in block 1122. Blocks 1124 onwards are the crux of the DTS engine, i.e., if the attack simulations need to be statefully executed based on received results from each stage, then the DTS engine performs the decision tree traversal accordingly. Decision block 1126 is used to cause the process block to go through each of the root nodes and then follow through their subsequent branches to simulate specific attacks one by one following results received through each simulation. Once the last node in the branch is processed, the logic proceeds to set BranchDone=0, and then proceeds to find the next root node in block 1130, otherwise continue down the current branch. Block 1132 is configured to simulate the attack, and then decision block 1134 is to record the result in the result parameter cache and block 1136 is to compare the result to expected results. If the results match, then the logic continues down the branch or else finds the next branch that matches received result from the current simulation, as depicted in block 1138.

Once the branch is complete, the logic moves on to the next root node and the process is repeated for that root node. In this manner, the entire tree is executed based on root nodes and their subsequent branches (attacks) simulated based on received results vs. the expected ones. Once all root nodes are exhausted then the decision tree walk-trough is complete and so are all the relevant attack simulations for this specific run of the DTS engine. The operations in block 1144 through are then to implemented to collect result from the target if the target is a simulated target, (block 1144) and consolidate those with the observed results locally at the attacker and then update the results database accordingly (block 1146). The DTS engine thread then decrements the total ThreadCount in block 1150 and the thread exits in end block 1150.

Figure 12:
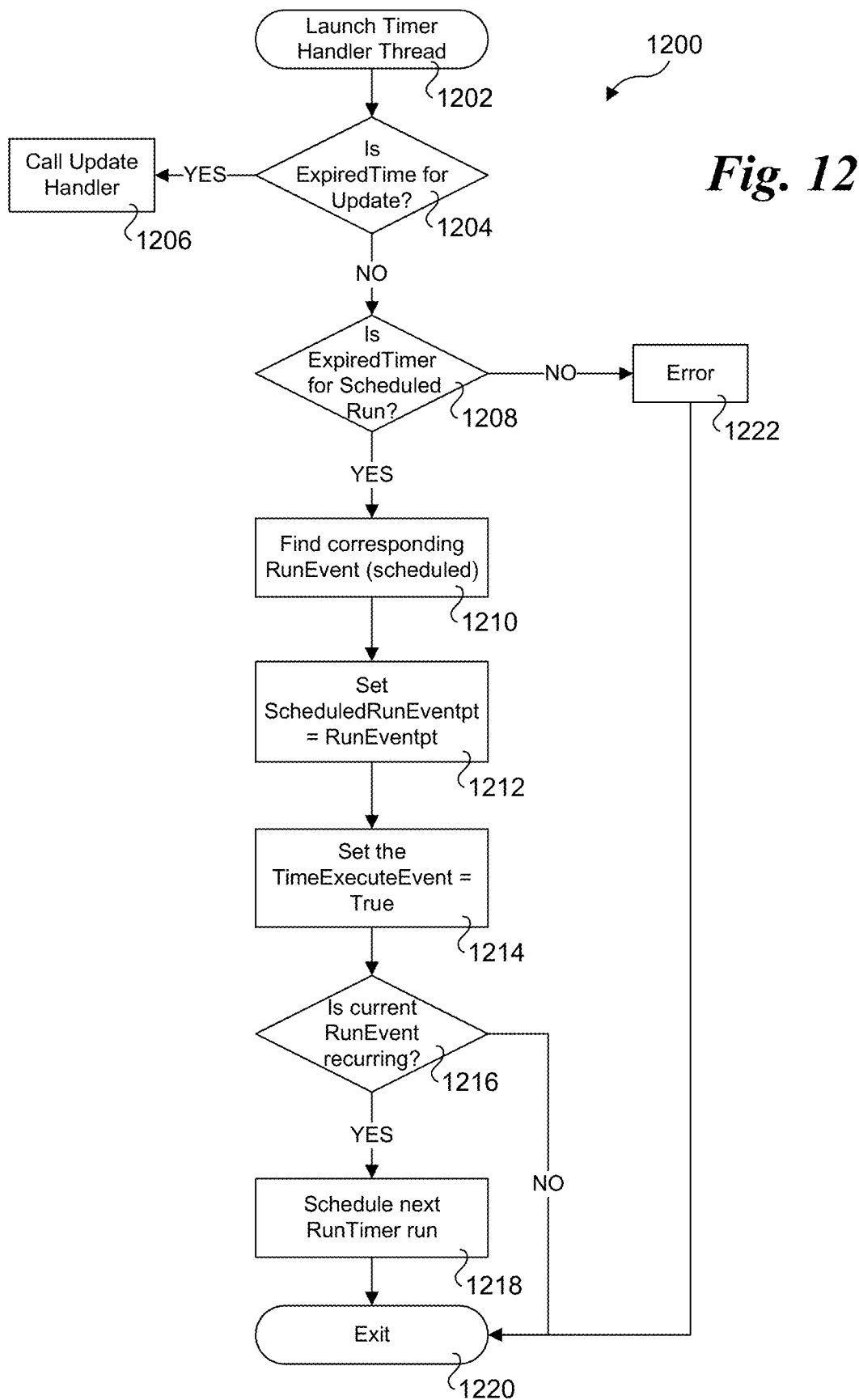
FIG. 12 is a flowchart illustrating operations of a timer handler called from main process 800 to handle timer driven events, according to one embodiment.

FIG. 12 shows a flowchart 1200 illustrating operations and logic implemented in one embodiment of the timer handler for the main process. A timer handler is launched in a start block 1202 in response to a call to handle timer expiry events. When the timer handler is invoked by the system, it receives a pointer to the timer event which expired. In a decision block 1204 the handler checks to determine whether the update timer that expired. If so, then an update handler function is called, as depicted in a block 1206.

In a decision block 1208 a determined is made to whether the timer event is a scheduled DTS run timer; if not, an error has occurred, and the timer handler reports the error in a block 1222 and then exits in an exit block 1220. If the timer event is a scheduled DTS run timer, the answer to decision block 1208 is YES, and the logic proceeds to btep 1210 to find the current event. In block 1212 the ScheduledRunEventpt pointer is set to the current run event so the main process can find the associated RunProfile and other relevant configuration to execute a DTS Engine run. In block 1214 the event variable is set to TRUE for the main process to identify it is the timer for scheduled run which expired. In a decision block 1216 a determination is made to whether a current running event is a recurring timer, and, if so, block 1218 reschedules the timer for the next run and then exits the timer handler at end block 1220. Otherwise, if the answer to decision block 1216 is NO, block 218 is skipped and the timer handler exits at end block 1220.

Figure 13:
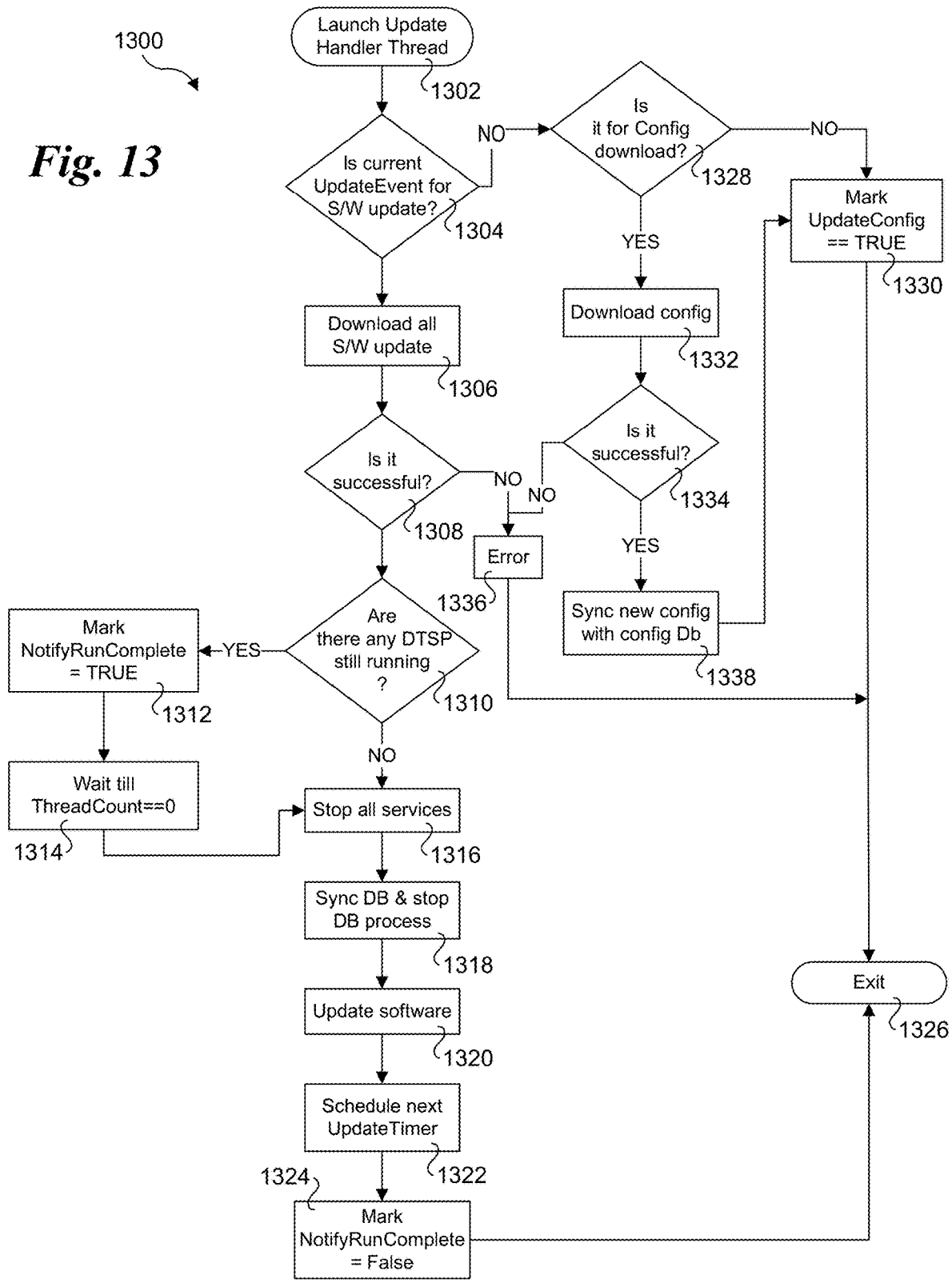
FIG. 13 is a flowchart illustrating operations of an update handler called from main process 800 to handle updates to the configuration database, according to one embodiment.

FIG. 13 shows a flowchart 1300 illustrating the logical flow of one embodiment of the update event handler function. The update event handler is usually called either by the timer handler, if the scheduled update timer expires, or by the console event handler, when a configuration update event occurs from the console, either of which results in an event handler thread being launched in a start block 1302. In a decision block 1304, a determination is made to whether the update handler needs to check for a software (S/W) update or handle the configuration update. If the current event is a software update, the logic proceeds to a block 1306 which checks with the update server and download all software updates that may be pending. If software update download fails, as determined in a decision block 1308, then an error is reported in a block 1336 and the process exits in end block 1326.

If software update download is successful, the logic proceeds to a decision block 1310 in which a determination is made whether there are any DTS Engine threads running. Software updates cannot be installed and updated until all currently running threads exit. If there are DTS Engine threads running, then the ThreadCount will be greater than zero, yielding a YES result for decision block 1310, which leads to blocks 1312 and 1314 which are used to notify the main process to not start any new DTS Engine threads and wait until all threads exit, as indicated by the ThreadCount being 0 in block 1314 Once all threads have exited, either as a result of waiting in block 1314 or a NO result for decision block 1310, the logic proceeds to a block 1316 in which all services are stopped. In a block 1318, the database is synchronized with all pending results or other updates and then end the database service. The software is than updated in a block 1320. In a block 1322, the software update timer is rescheduled for the next software update. Finally, in a block 1324 the NotifyRunComplete parameter is set to FALSE so the main process can continue executing DTS Engine threads, and the process exits in exit block 1326.

If the current UpdateEvent is to update the configuration, the answer to decision block 1304 is NO, and the logic will proceed to perform the operations in blocks 1328 through 1338 to handle the configuration update. In decision block 1328 a determination is made to whether the configuration update is for a configuration download. If it is, the configuration download is performed in a block 1332, and a determination is made in a decision block 1334 to whether the configuration download is successful. If so, the logic proceeds to a block 1334 to sync with the configuration database which contains configuration and RunProfiles with relevant information. The logic then proceeds to a block 1336, in which the global variable UpdateConfig is marked as TRUE so the main process can reload the config database for subsequent DTS Engine runs. The handler then exits at exit block 1326. As before, if the configuration download is not successful, the logic proceeds to generate an error in error block 1336 and then exits in exit block 1326.

Example Use Cases

The following paragraphs describe some example uses cases in which aspects of the foregoing embodiments may be implemented. It is noted that these use cases are merely exemplary and non-limiting, as the principles and teachings disclosed herein may be advantageously applied to various use cases and environments.

SIMULATED EXAMPLE 1

In this simulation, a combined attacker-target module is running on the target system (for example, an endpoint device, network device or an application server) and it works in conjunction with an external command-and-control module. (attack-1) The attacker module simulates sending a spear-phishing email to the user on the target system. If an infrastructure security solution running either on the target system or on the network does not block the phishing email, then it simulates as if the user clicks on the received phishing email (attack-2). The attacker module will (attack-3) simulate downloading a RAT (remote-access-terminal) like malware. If the malware download is not blocked, then (attack-4) it will simulate as if the malware tries to install on the user's machine. If the installation is not blocked, then (attack-5) it simulates the malware is performing local recon, like scanning system info, scanning drives for local files and apps, what other machines may be accessible etc. (various attacks). It then learns whether there are any accessible servers on local network (attack-6). It can then try to propagate to that server (which may be running another combined attacker-target module) through some vulnerability exploits (attack-7)—and so on.

Simulated Example-2 performs a similar simulation as in Example-1, but instead of malware like RAT, the attacker-target module simulates downloading a Ransomware or Crypto-lock type of malware. The attacker-target then simulates installing the ransomware on the user's machine (attack-3), if it's blocked then potentially attack ends here or it can try to start just a simple process (attack-4). If not blocked, then it simulates copying a system file in to a temp file and encrypt it (attack-5). If copying is allowed, then it establishes a command-and-control (C&C) connection with an external C&C module (attack-next), then simulates receiving an encryption key from C&C to use as encryption key (attack-6), it then encrypts some pseudo files to see if that attempt is blocked (attack-7)—and so on.

In simulated Example-3 and Example-4, a separate attacker and target modules are used. The attacker and target modules are running on two separate systems on the local network of a company, one acting as the attacker and the other is the real target system where security verification needs to be performed.

Simulated Example-3: The attacker module scans available application ports (attack-1) on the target server, once it finds the open port of a service (simulated by the target module), it attempts to connect to it using ssh or telnet or such other known interactive app (attack-2). If a login prompt is received (sent by target module), then a password cracker (attack-3) is executed. If not, then based on information received from the app port, like type of app (e.g. database), version #, app/vendor name, attacker module can then use that information to identify potential vulnerabilities of that app and try exploiting a one of the common ones (attack-4). If any of them succeed, then an access to the machine is simulated. The attacker module will then start collecting information like dumping target system information (attack-5), crawling through database server (attack-6) and then simulate shadow-IT connection like accessing external storage system (attack-7) to exfiltrate the data out of the company.

Simulated Example-4: The same attacker module (as in Example-3) can simulate to perform various privilege escalation techniques (various attacks) to see confidential data from the target server can be extracted without trying to break in to the system. If any of them succeed, then it collects a set of data which can then be exfiltrated in various ways (various attacks).

Simulated Example-5. In Example-5, similar to Examples-3 and -4 above, two separate attacker and target modules are used. The difference in Example-5 is the attacker module is running on a system on an external (remote) network and remotely accessing a company's target server (where the target-module is running), whether the target server is local on the company's local network or in the company's private virtual cloud.

In Example-5 the external attacker module performs various scans on the company's visible web-app server (attacks-1), generates various Denial-of-Service (DoS) (attacks-2) and performs repeated web-crawling operations (attacks-3) to build the web-app map. With that knowledge, the attacker module then moves on simulating attacks against detected web-app weaknesses (attacks-4) etc. If any of them succeed, then perform further exploration (attack-5) and data collection (attacks-6) etc.

By simulating sets of attacks in various sequences based on results observed from each prior attack to methodically verify various infrastructure detection and enforcement points, IT security teams will be enabled to better understand how effective their security infrastructure readiness is against such threats that evolve over a breach life-cycle. This approach also provides an attack trail for the IT security team to follow from beginning to end, providing real-life behavioral detection and forensic analysis training.

Exemplary Implementation Environment

In accordance with some embodiments, it is envisioned that aspects of the method and systems described herein may be implemented in a data center and/or server farm environment. Typically, the servers used in data centers and server farms comprise arrayed server configurations such as rack-based servers or blade servers. These servers are interconnected in communication via various network provisions, such as partitioning sets of servers into LANs with appropriate switching and routing facilities between the LANs to form a private Intranet. For example, cloud hosting facilities may typically employ large data centers with a multitude of servers. Some enterprises may operate similar configurations either on-site or offsite through either their own hosted service or using a third-party service such as Amazon Web Services (AWS) or Microsoft Azure.

As an overview, typical blade server components and systems are shown in FIGS. 14*a-c*, and 15. Under a typical configuration, a rack-mounted chassis 1400 is employed to provide power and communication functions for a plurality of server blades (i.e., blades) 1402, each of which occupies a corresponding slot. (It is noted that all slots in a chassis do not need to be occupied.) In turn, one or more chassis 1400 may be installed in a blade server rack 1403 shown in FIG. 14*c*. Each blade is coupled to an interface plane 1404 (i.e., a backplane or mid-plane) upon installation via one or more mating connectors. Typically, the interface plane will include a plurality of respective mating connectors that provide power and communication signals to the blades. Under current practices, many interface planes provide "hot-swapping" functionality—that is, blades can be added or removed ("hot-swapped") on the fly, without taking the entire chassis down through appropriate power and data signal buffering.

Figure 14A:
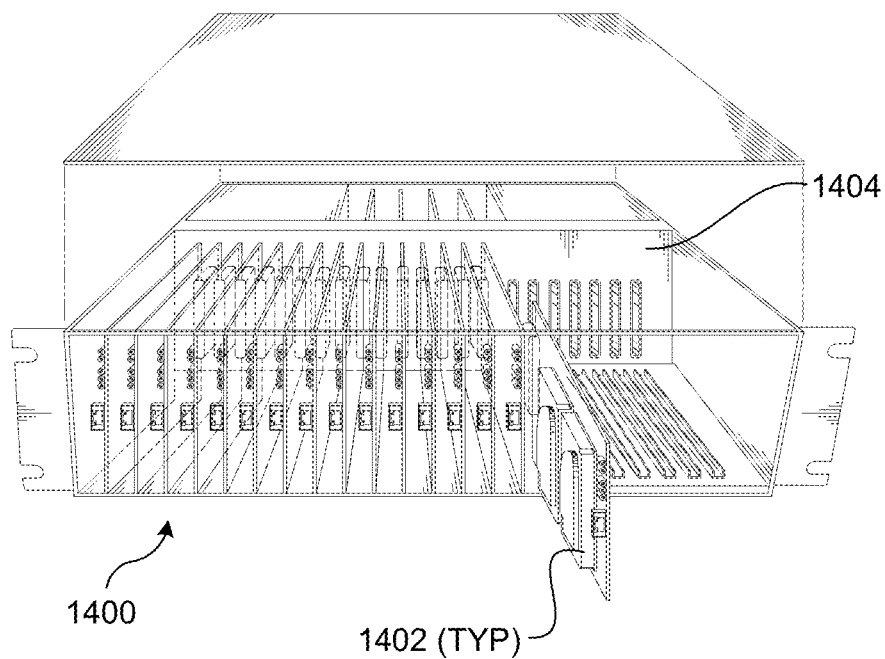
FIG. 14a is a frontal isometric view of an exemplary blade server chassis in which a plurality of server blades is installed.
Figure 14B:
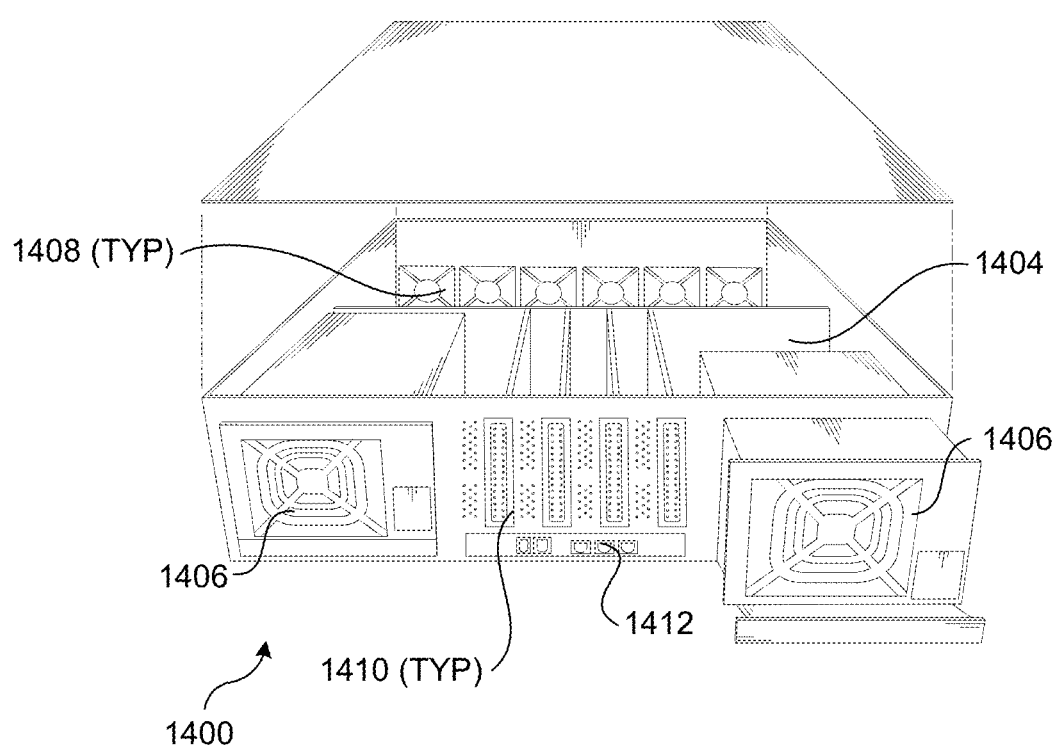
Figure 14C:
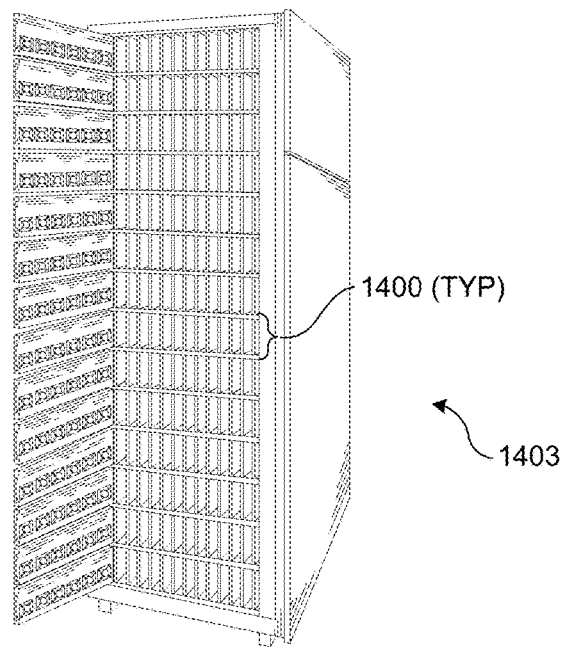
FIG. 14c is an isometric frontal view of an exemplary blade server rack in which a plurality of rack-mounted blade server chassis corresponding to FIGS. 11a and 11b are installed.

A typical mid-plane interface plane configuration is shown in FIGS. 14*a* and 14*b*. The backside of interface plane 1404 is coupled to one or more power supplies 1406. Oftentimes, the power supplies are redundant and hot-swappable, being coupled to appropriate power planes and conditioning circuitry to enable continued operation in the event of a power supply failure. In an optional configuration, an array of power supplies may be used to supply power to an entire rack of blades, wherein there is not a one-to-one power supply-to-chassis correspondence. A plurality of cooling fans 1408 are employed to draw air through the chassis to cool the server blades.

An important feature required of all blade servers is the ability to communicate externally with other IT infrastructure. This is typically facilitated via one or more network connect cards 1410, each of which is coupled to interface plane 1404. Generally, a network connect card may include a physical interface comprising a plurality of network port connections (e.g., RJ-45 ports), or may comprise a high-density connector designed to directly connect to a network device, such as a network switch, hub, or router.

Blade servers usually provide some type of management interface for managing operations of the individual blades. This may generally be facilitated by a built-in network or communication channel or channels. For example, one or more buses for facilitating a "private" or "management" network and appropriate switching may be built into the interface plane, or a private network may be implemented through closely-coupled network cabling and a network. Optionally, the switching and other management functionality may be provided by a management switch card 1412 that is coupled to the backside or frontside of the interface plane. As yet another option, a management or configuration server may be employed to manage blade activities, wherein communications are handled via standard computer networking infrastructure, for example, Ethernet.

Figure 15:
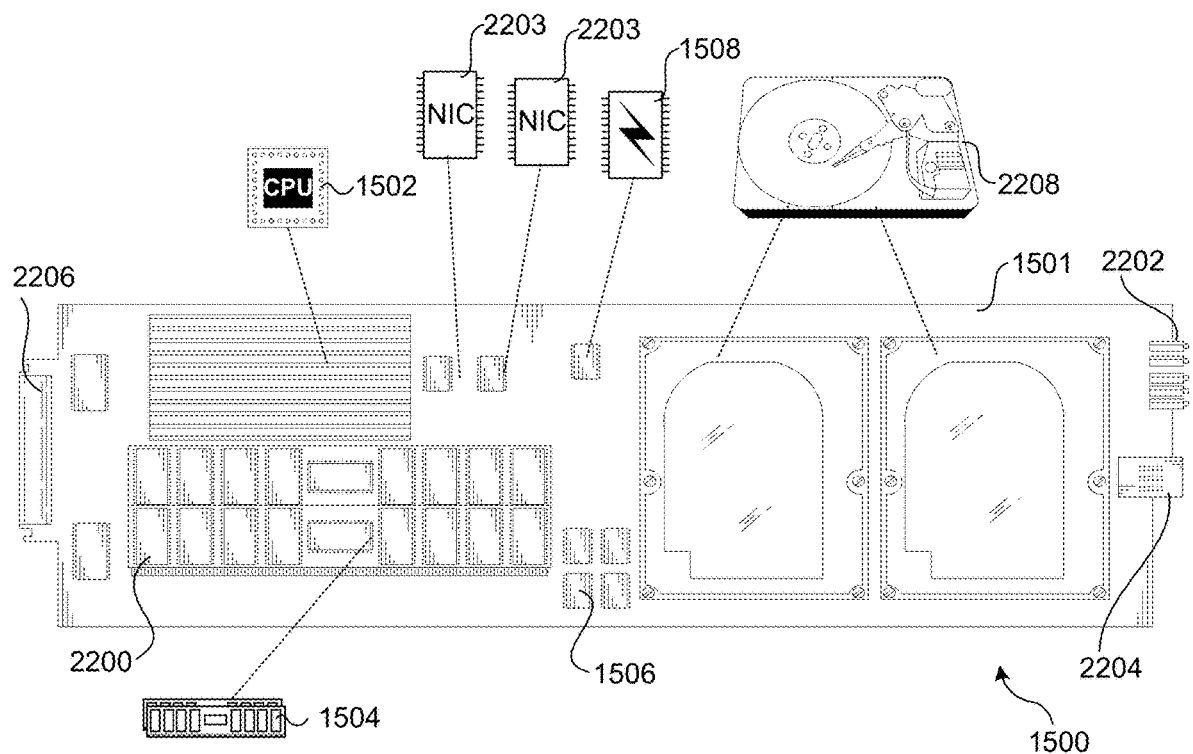
FIG. 15 shows details of the components of a typical server blade, according to one embodiment.

With reference to FIG. 15, further details of an exemplary blade 1500 are shown. As discussed above, each blade comprises a separate computing platform that is configured to perform server-type functions, i.e., is a "server on a card." Accordingly, each blade includes components common to conventional servers, including a main printed circuit board (main board) 1501 providing internal wiring (i.e., buses) for coupling appropriate integrated circuits (ICs) and other components mounted to the board. These components include one or more processors (e.g., multi-core processors) 1502 coupled to system memory 1504 (e.g., some form of Dynamic Random Access Memory (DRAM), such as DRAM DIMMs, RDIMMs and/or NVDIMMs), cache memory 1506 (e.g., SDRAM), and a firmware storage device 1508 (e.g., flash memory). A NIC (network interface controller) chip 1510 is provided for supporting conventional network communication functions, such as to support communication between a blade and external network infrastructure. Other illustrated components include status LED (light-emitting diodes) 1512, one or more NICs 1513 coupled to a set of RJ-45 console ports 1514 (only one of which is shown for simplicity), and an interface plane connector 1516. Additional components include various passive components (i.e., resistors, capacitors), power conditioning components, and peripheral device connectors.

Generally, each blade 1500 may also provide on-board storage. This is typically facilitated via one or more built-in disk controllers and corresponding connectors to which one or more disk drives 1518 are coupled. For example, typical disk controllers include SATA controllers, SCSI controllers, and the like. As an option, the disk drives may be housed separate from the blades in the same or a separate rack, such as might be the case when a network-attached storage (NAS) appliance or backend storage sub-system that is employed for storing large volumes of data. Generally, the disk drives may be solid state drives, (SSDs), magnetic drives and/or optical drives).

In a typical data center deployment, network switching elements comprise rack-mounted equipment, such as a Top-of-Rack (ToR) switch or similar switching elements may be implemented as stand-alone components occupying a 1U, 2U, or 4U slot in the rack. Optionally, a network switching element may be implemented use one or more server blades. In addition to conventional network communication components, such as Ethernet and InfiniBand, other communication facilities, such as to support communication over a wired or optical fabric, may also be provided (not shown).

In addition to the blade server configuration illustrated in FIGS. 14*a*-14*c* and 15, other type of servers may be implemented, including both standalone servers and rack-mounted servers. For example, 1U, 2U and 4U servers or server chassis housing server modules or the like may be used. In some embodiments, rack and server components in accordance with INTEL® Corporations Rack Scale Design may be implemented. In addition, other types of rack-based architecture may be used, including both standardized and proprietary architectures.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the elements. If the specification or claims refer to "an additional" element, that does not preclude there being more than one of the additional elements.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

As discussed above, various aspects of the embodiments herein may be facilitated by corresponding software and/or firmware components and applications, such as software and/or firmware executed on a processor or the like. Thus, embodiments of this invention may be used as or to support a software program, software modules, firmware, and/or distributed software executed upon some form of processor, processing core or a one or more virtual machines running on a processor or core or otherwise implemented or realized upon or within a non-transitory computer-readable or machine-readable storage medium. Generally, the software programs and/or modules may be configured to be executed on a single host machine, such as a server, or may be distributed and executed on multiple host machines. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein. It will be further understood, that the software for implementing various aspects of the embodiments described and illustrated herein may be executed on physical hardware, such as machine code execute on processor cores in multicore processors, as well as executed using virtual machines or containers running on underlying physical hardware through use of Type-1 Hypervisors, Type-2 Hypervisors, Virtual Machine Monitors (VMMs), Docker, etc.

In some of the illustrated embodiments, multiple databases are depicted. However, it will be understood by those skilled in the art that the use of multiple databases is merely illustrative and non-limiting, as the functionality of the databases described herein may be implemented using either a single database or multiple databases. Moreover, such a database or databases may be implemented using one or more database instances running on a single host machine, or may be implemented in a distributed manner through facilities provided by multiple host machines.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for determining exploitable vulnerabilities of one or more targets, comprising:
    retrieving a plurality of attack templates defining a plurality of attacks that may be executed against the one or more targets, wherein an attack template contains data representative of attack execution steps associated with one or more attacks defined in the attack template;
    compiling a decision tree using the plurality of attack templates to create a logical tree with tree branches representing different execution paths through which attacks may be executed against one or more targets, wherein an initial decision tree having a depth of at least three levels is compiled using the plurality of attack templates;
    executing one or more attacks derived from the execution paths in the decision tree to generate and transmit attack traffic over a communications network to the one or more targets; and
    for each attack template for which one or more attacks are executed for a target,
        collecting, for the target to which attract traffic was sent, results for the attack traffic; and
        processing the results to determine exploitable vulnerabilities for the target.

2. The method of claim 1, wherein the one or more targets includes one or more of a network device, server, and endpoint within a security infrastructure.

3. The method of claim 2, wherein the attacks originate from a computer system that is within the security infrastructure.

4. The method of claim 2, wherein the attacks are executed remotely using a computer system that is external to the security infrastructure.

5. The method of claim 1, wherein the one or more targets includes one or more simulated targets.

6. The method of claim 1, wherein the attacks against a given target are executed in an attack sequence that is dynamically determined.

7. The method of claim 6, further comprising:
    dynamically determining an attack sequence by traversing branches in the decision tree in view of results obtained from prior attacks in the attack sequence.

8. The method of claim 1, wherein the attacks against a given target include a multi-stage attack against the target corresponding to a cyber-kill-chain or a security breach life-cycle.

9. A method, comprising:
    accessing a list of attack templates, each defining one or more attacks that may be executed against one or more targets, the list of attack templates comprising a plurality of attack templates;
    accessing, for each attack template, data representative of the one or more attacks defined in the attack template;
    compiling a decision tree using a decision tree compiler to create a decision tree by traversing through the list of attack templates to create a logical tree with tree branches representing different execution paths through which attacks may be executed against one or more targets; and
    executing a sequence of attacks derived from the execution paths in the decision tree against at least one target, wherein an initial decision tree having a depth of at least three levels is compiled using the plurality of attack templates.

10. The method of claim 9, wherein the at least one target includes one or more of a network device, server, and endpoint within a security infrastructure.

11. The method of claim 10, wherein the attacks originate from a computer system that is within the security infrastructure.

12. The method of claim 10, wherein the attacks are executed remotely using a computer system that is external to the security infrastructure.

13. The method of claim 9, wherein the at least one target includes one or more simulated targets.

14. The method of claim 9, further comprising dynamically determining the sequence of attacks by traversing branches in the decision tree in view of results obtained from prior attacks in the sequence.

15. The method of claim 9, wherein the attacks against a given target include a multi-stage attack against the target corresponding to a cyber-kill-chain or a security breach life-cycle.

16. The method of claim 1, wherein exploitable vulnerabilities include two or more of network vulnerabilities, operating system vulnerabilities, application vulnerabilities and data vulnerabilities.

17. The method of claim 1, wherein exploitable vulnerabilities include three or more of network vulnerabilities, operating system vulnerabilities, application vulnerabilities and data vulnerabilities.

18. The method of claim 9, wherein exploitable vulnerabilities include two or more of network vulnerabilities, operating system vulnerabilities, application vulnerabilities and data vulnerabilities.

* * * * *